United States Patent [19]

Wagner et al.

[11] 4,293,204
[45] Oct. 6, 1981

[54] PHOTOGRAPHIC CAMERA HAVING AN AUTOMATIC EXPOSURE CONTROL

[75] Inventors: Karl Wagner, Munich; Dieter Engelsmann, Unterhaching; Hubert Hackenberg, Holzkirchen; Peter Stiefel, Munich, all of Fed. Rep. of Germany

[73] Assignee: AGFA-Gevaert Aktiengesellschaft, Leverkusen, Fed. Rep. of Germany

[21] Appl. No.: 116,803

[22] Filed: Jan. 30, 1980

[30] Foreign Application Priority Data

Feb. 12, 1979 [DE] Fed. Rep. of Germany ....... 2905248

[51] Int. Cl.³ .......................... G03B 7/00; G03B 15/02
[52] U.S. Cl. ..................................... 354/21; 354/127; 354/196; 354/198
[58] Field of Search ................. 354/21, 198, 127, 128, 354/145, 196

[56] References Cited

U.S. PATENT DOCUMENTS

| | | | |
|---|---|---|---|
| 3,368,467 | 2/1968 | Hahn | 354/21 |
| 3,481,259 | 12/1969 | Langnau et al. | 354/21 |
| 3,491,670 | 1/1970 | Rentschler | 354/21 |
| 3,500,731 | 3/1970 | Bresson et al. | 354/21 |
| 4,085,410 | 4/1978 | Maeda et al. | 354/21 |
| 4,121,230 | 10/1978 | Ohmura et al. | 354/21 |
| 4,163,613 | 8/1979 | Smart | 354/198 |
| 4,217,042 | 8/1980 | Yan | 354/21 |

*Primary Examiner*—Russell E. Adams
*Attorney, Agent, or Firm*—Michael J. Striker

[57] ABSTRACT

The control mechanism for a photographic camera using film carrtridges having coded marks indicative of the sensitivity of the employed film includes a hand-operated control member for setting at least one exposure parameter, an axially movable objective for setting the distance, an adjustable diaphragm, a scanner movable against the marks on the cartridge for displacing the control member in response to the coded marks, a stationary cam surface engaging the objective, transmission gears coupled between the control member and the objective to axially displace the latter according to a distance setting and according to the shape of the stationary cam and curves provided on the control member to display at least the applicable exposure range and the flash distance limits for the employed film sensitivity.

16 Claims, 6 Drawing Figures

PHOTOGRAPHIC CAMERA HAVING AN AUTOMATIC EXPOSURE CONTROL

BACKGROUND OF THE INVENTION

This invention relates generally to cameras having an automatic exposure control and more particularly it relates to a film cartridge camera having a hand operated control element for setting at least one exposure parameter, the film cartridge being provided with shaped coded marks indicative of the sensitivity of the contained film and cooperating with a scanner which is coupled to a movable film carrier for displaying the film sensitivity.

SUMMARY OF THE INVENTION

It is an object of this invention to provide a photographic camera of the above-described type in which it is possible to adjust by means of the single control element to adjust exposure parameters both in the daylight exposure range and in the flash exposure range.

Another object of this invention is to provide such an improved camera which is simple in structure and inexpensive in manufacture.

An additional object of the invention is to provide such an improved camera which is capable of automatic exposure control or, if desired, of a hand-operated selection of exposure and focusing parameters.

In keeping with these objects and others which will become apparent hereafter, one feature of the invention resides, in a photographic camera of the aforedescribed type, in the provision of a stationary cam surface, an axially movable objective engaging the cam surface and being coupled to the control member for adjusting the distance according to a predetermined curve which is related to the movement of the scale carrier whereby the scale portion displayed in a stationary window is indicative of distance limits applicable in the flash range for the employed film sensitivity.

In the preferred embodiment, the camera is provided with an adjustable diaphragm which is also coupled to additional movable cams controlled by the movement of the objective to adjust the aperture for the daylight range and the flash range. By using the control of the objective axial displacement by means of the stationary cam surfaces it is possible to obtain arbitrary coordination between the individual settings of distance and the remaining exposure parameters such as the aperture setting, the time setting, the flash range setting and the like. It is also possible to reverse the movements of the objective while maintaining the movement of the control member or element in the same direction. This movement reversal of the objective is particularly useful when transiting from the daylight setting range to the flash setting range. By virtue of the automatic scanning of the sensitivity code marks of the film cartridge it is achieved that the scale carrier is displaced in a very simple manner and thus enables the corresponding adjustment of the distance limits in the flash range.

In the preferred embodiment of this invention the stationary cam surface for controlling the distance includes three cam segments angularly displaced one from the other about 120° and each defining a surface portion for setting the distance in the flash range and an adjoining cam surface portion for setting the distance in the daylight range.

According to another feature of this invention the control element is in the form of an elongated slider which is coupled to the objective by means of transmission means provided with movable cam surfaces.

The transmission means includes an intermediate sleeve surrounding the movable part of the objective which is provided on its surface with axially directed guiding grooves. The intermediate sleeve has on its inner surface corresponding projections engaging the guiding grooves. The sleeve is surrounded by a cam ring defining on its periphery the movable additional cam surfaces and a gear segment engaging a tooth rack provided on the elongated control element. The inner wall of the ring is coupled to the sleeve by similar groove and pin connections.

One of the movable cam surfaces is assigned to the daylight range and if its cam curve has no slope the set aperture of the diaphragm undergoes, during the movement of the objective, no change. This arrangement of the movable cam surfaces provided on the adjustable cam ring is suitable particularly for cooperation with an electronic control of exposure times so that the control member in the daylight range is employed exclusively for the distance setting. If, however, the control member is displaced into the flash range, the second movable cam which is provided with a suitable inclined curve becomes effective and adjusts the diaphragm aperture or the exposure time to the flash range. The length and the inclination of the second movable cam is adjusted to the curve of the stationary cam. The displacement of the scale carrier resulting from the scanning of the coded marks on the film cartridge and the corresponding indication of the film sensitivity in the daylight range has to be effected by electrical or optical means. In the flash range, however, the indication of the film sensitivity is indicated by the displacement of the scale carrier.

If the camera of this invention is to be constructed with a hand adjustable exposure control, it is sufficient to provide the movable control cams with suitable slopes so that also within the range of daylight exposure settings with cam rings which form a part of the transmission between the control element and the objective, the coupling means to the diaphragm adjust different apertures and also if desired, adjust different exposure times when coupled to the electronic time control means. Preferably, the focal length of the objective is selected such that it permits one to axially displace the movable part of the objective towards a medium distance value such as, for example, 5 meters. When the cam pertaining to the daylight range is without slope, the aforementioned medium distance value is kept constant.

Preferably, the length of the movable cams on the transmission cam ring which sets the stop values is made equal to the length of the control cam for the movable objective part.

The individual parts of the camera are constructed as functional modules which can be easily assembled and thus permit with minimum expenditures for additional parts and by using a large number of uniform construction elements the manufacture of cameras having an automatic exposure control as well as cameras having hand-operated exposure adjustment.

In the case of a camera having a built-in flash device, the single control element enables during the transit into the shooting range for flash exposed pictures the connection of a voltage source to the flash device and at the same time to activate an indicator signaling the operational readiness of the flash device. Upon the transition of the control element into the setting range for the daylight picture-taking the voltage source is disconnected and the indication signal is turned off.

Preferably, the indicator for the flash range is controlled by a cover flag coupled to the control element in the form of an elongated slider. The cover flag in another embodiment of the camera of this invention is also provided with an operational attachment having a switching contact for the electronic flash device.

The flash range indicator is preferably a light-emitting diode or a glow lamp fed from a storage capacitor and the control means for the indicator is a coupling or switching element between the diode and the capacitor. In the preferred embodiment of this invention, the scale carrier which is connected to the control element is displaceable below at least one window in the wall of the camera housing which displays the adjusted exposure parameters on the one hand and in dependence on the sensitivity of the employed film scanned from the coded marks on the cartridge also displays the distance limits in the flash range. The lowermost distance values are displayed in the window on a stationary plate whereas the upper limit values are formed on the elongated slider which is movable below a cutout in the stationary plate adjoining the stationary lowermost distance values. When the camera of this invention is provided with an electronic exposure control device the window in the housing shows the largest distance limit determined according to the sensitivity code of the employed film cassette.

In still another embodiment of this invention there is provided a particularly simple diaphragm setting mechanism for the flash range operating in dependence on the distance setting and taking into account the sensitivity of the employed film. In the employed mechanism, the diaphragm is not controlled by the movable cams on the cam ring while there is provided a separate diaphragm with a fixed aperture which is movable across the adjustable diaphragm and the position of which is controlled by the slide member for the coded marks on the film cartridge. For coded marks indicating high film sensitivity the additional diaphragm is displaced by the scanning member into an operative position in the path of rays passing through the objective. The aperture of the additional diaphragm is smaller than the smallest aperture of the main diaphragm adjusted for the daylight exposure range. During the transition of the control element into the flash exposure range the main diaphragm is adjusted to a larger aperture. The size of the aperture of the additional diaphragm is selected such that it cooperates with the relatively large aperture of the adjustable main diaphragm when the latter is set for the flash operation.

According to still another feature of this invention the additional diaphragm is coupled to the shutter cocking mechanism and is provided with a hook-like attachment which engages the scanner when the latter is displaced by a coded mark indicative of a low film sensitivity whereby the additional diaphragm is displaced out of the way of the light beam passing through the objective.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
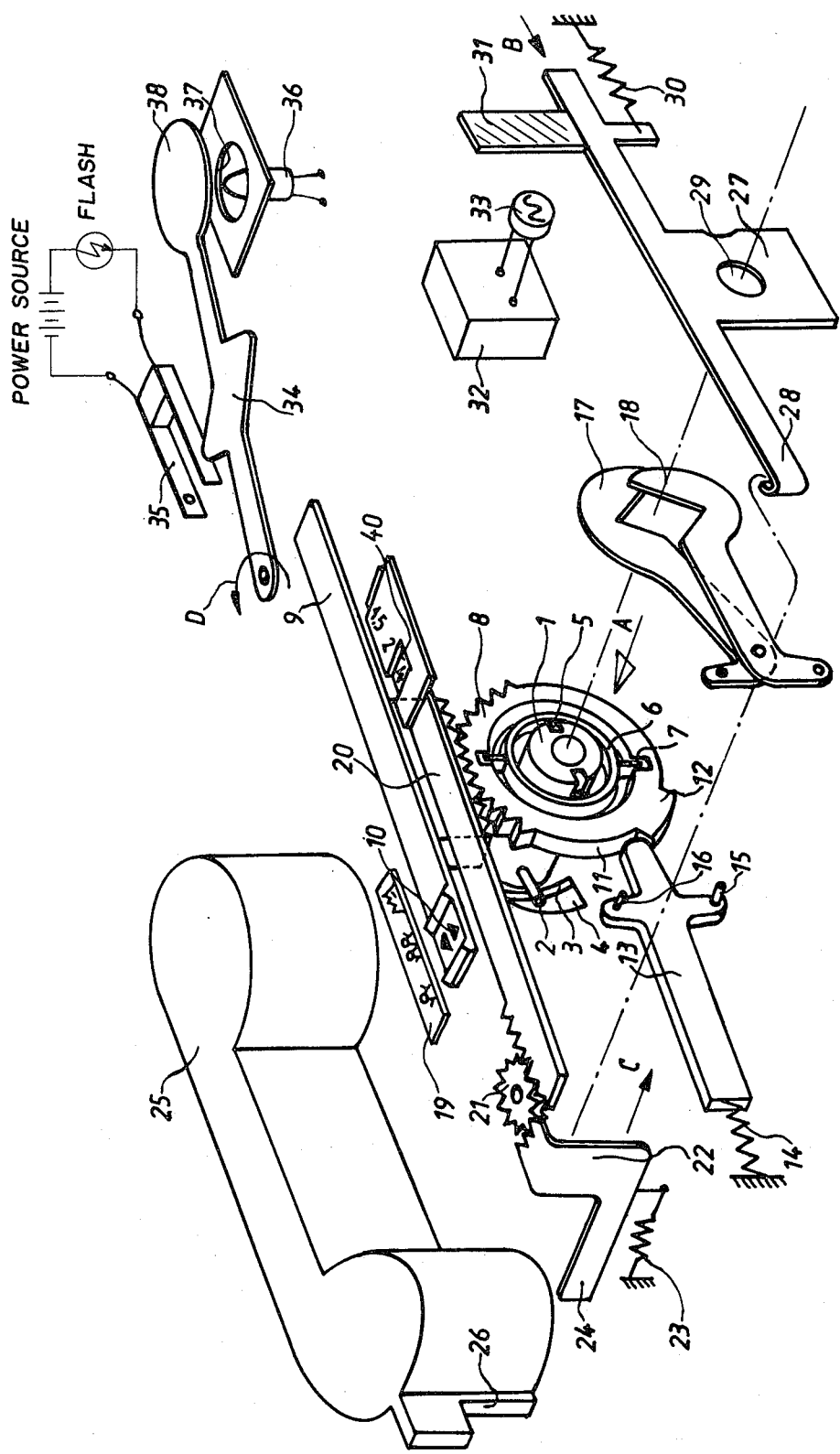
FIG. 1 is a perspective exploded view of the combined exposure control mechanism in a camera of this invention.

Referring to FIG. 1, there is illustrated a movable part of an objective 1 which is movable in its axial direction as indicated by arrow A. The support of the objective 1 is provided at its rear end with projecting pins 2 engaging a cam surface 3 of a stationary cam 4. For the sake of symmetrical force distribution, there are provided three cams 4 angularly displaced one from the other about 120° whereby for the sake of clarity only one of these cams is illustrated in FIG. 1. The front end of the support of objective 1 is provided with guiding grooves 5 which cooperate with corresponding pins of an intermediate sleeve 6. The outer surface of sleeve 6 is provided also with projecting attachments engaging guiding grooves in the inner surface of a cam ring 8. The cam ring 8 defines on its periphery a gear segment which engages a tooth rack formed in an elongated sliding member 20 which is coupled to a control element 9 provided with markings 10.

The cam ring 8 is also formed on its periphery with a first movable cam 11 which in this example is formed without any inclined portion. This first movable cam 11 is assigned to the daylight exposure range of the camera. The cam 11 adjoins a second movable cam 12 which is assigned to the flash exposure range. A displaceable control lever 13 is biased by a spring 14 into engagement with one of the movable cams 11 and 12. The control lever 13 is provided with pins 15 and 16 which engage diaphragm blades 17 and 18 in front of the objective 1. As long as the control lever 13 engages the first movable cam 11, the pins adjust the diaphragm aperture to a stop value 8 corresponding to the daylight exposure range. When the cam ring 8 is rotated into the flash exposure range, the movable cam 12 displaces the control lever 13 and the pins adjust the diaphragm blades 13 and 18 to such a position which defines an aperture having a stop value 4, for example.

Markings 10 on the control element 9 are movable in front of a fixed distance scale 19 pertaining to the daylight exposure range. In this manner when markings 10 on the control element 9 are moved in front of the daylight distance scale 19, indicating the positions for close distance to infinite, the objective is moved by means of the transmission gears in its axial direction and the stationary cam 13 adjusts the corresponding distance settings without changing the aperture of the diaphragms 17 and 18.

Sliding member 20 acts also as a scale carrier for a scale 41 which denotes the distance limit value for the setting in the flash range. Each maximum distance limit is visible through a window in the housing of the camera. The lowermost distance limit values are provided on a stationary fixed plate adjoining the scale on the slider 20.

The rear edge of the slider 20 is provided with an additional tooth rack engaging a pinion 21 which in turn is driven by the cartridge scanning member 22 having a projection 24 engaging a coded mark 26 formed on the film cartridge 25 and indicating the film sensitivity marked in DIN. The scanning member 22 is supported for sliding movement in the direction indicated by arrow C and is spring biased by spring 23 against the coded mark 26. The front edge of the scanning member 22 serves simultaneously for arresting hook-shaped member 28 of a sliding diaphragm 27. This sliding diaphragm has a fixed aperture 29 corresponding for example to a stop value 5.6. The sliding diaphragm 27 is movable across the optical axis of the objective 1 and is spring biased by a spring 30 into a position in which its aperture 29 is in alignment with the optical axis. The sliding diaphragm 27 is coupled with a non-illustrated shutter cocking mechanism of the camera so that during each shutter cocking and film advancing movement the sliding diaphragm 27 is displaced in the direction of arrow B. The sliding diaphragm 27 also supports a grey wedge 31 cooperating with electronic exposure time setting device 32 which is controlled by a photosensitive element 33.

When a film cartridge is employed which contains a film having the sensitivity of DIN 19, the coded mark 26 has the form of a continuous attachment which displaces the scanning member 24 in the direction of arrow C. As a result, the leading edge of the scanner 22 is displaced transversely to the direction of movement of the hook-shaped member 28 of the sliding diaphragm 27 and arrests the latter in a position in which the fixed aperture 29 is offset from the optical axis of the objective 1 and consequently only the aperture of the adjustable diaphragm 17 and 18 is effective. In this position, the grey wedge 31 is also placed in front of the photosensitive element 33.

If a film cartridge including a film of a sensitivity of 27 DIN for example, is inserted into the camera, the coded mark 26 corresponding to this sensitivity has the shape as illustrated in FIG. 1 which permits the scanning member 24 to be displaced counter to the direction of arrow C and consequently the hook-shaped member 28 cannot be arrested by the edge of the scanning member 22 and the sliding diaphragm returns to its illustrated position in which the aperture 29 is in alignment with the optical axis. In this aligned position the grey wedge 31 is offset from the photosensitive element 33 of the time setting electronic unit 32. As seen from FIG. 2, when a film cartridge for 19 DIN is employed, the upper limit value for the flash range is 3 meters whereas when a film cartridge for a 27 DIN film is employed the displayed upper limit value for the flash is 4 meters.

Due to the fact that the fixed aperture 29 of the slidable diaphragm has a smaller value than the smallest stop value of the aperture formed by the adjustable diaphragm plates 17 and 18, the advantage results that the additional diaphragm has no effect in the set range for the daylight exposure. In the range setting for the flash in contrast, the diaphragm blades 17 and 18 adjust an aperture which has a smaller value than that of the fixed aperture 29 of the sliding diaphragm and the latter takes effect in dependence on the sensitivity of the employed film.

Figure 2:
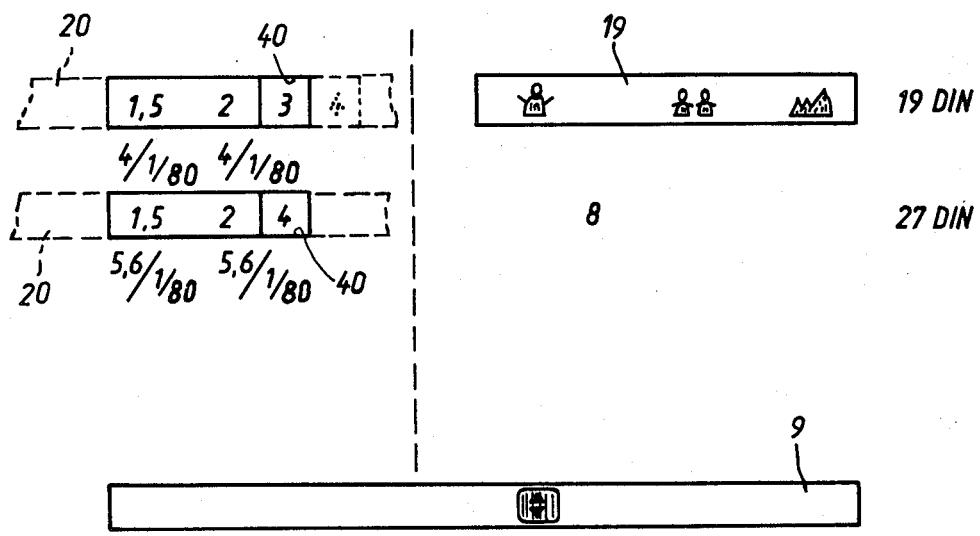
FIG. 2 illustrates the distance indications appearing in the window of the camera for different film sensitivities in the embodiment of FIG. 1.

During the displacement of the control member 9 and of the associated slider 20 into the flash range position, a flash control lever 34 is pivoted in the direction indicated by arrow D and actuates a switch 35 which turns on an electronic flash device built in the camera. A glow indication lamp 36 serves for the indication of the ready to operate condition of the built-in flash device. The glow lamp 36 is visible through a window 37 in the wall of the camera housing. During the displacement of the control member 9 into the flash exposure range the control lever 34 displaces a cover flag 38 clear of the window 37 and makes the indication lamp 36 visible. FIG. 2 illustrates schematically the displayed scale indicating the flash distance limits for two different cartridges and the distance setting for the daylight exposure range.

Figure 3:
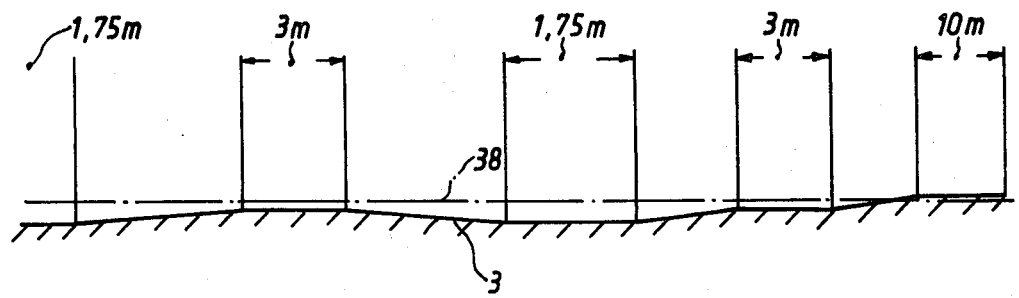
FIG. 3 illustrates schematically the development of the curve of the stationary cam in FIG. 1 for setting various distances.

FIG. 3 illustrates the development of the curve of the stationary cam 3 with relation to a straight reference line 38 and showing at the left-hand side the set distances in the flash range and at the right-hand side the distances for the daylight exposure range.

Figure 4:
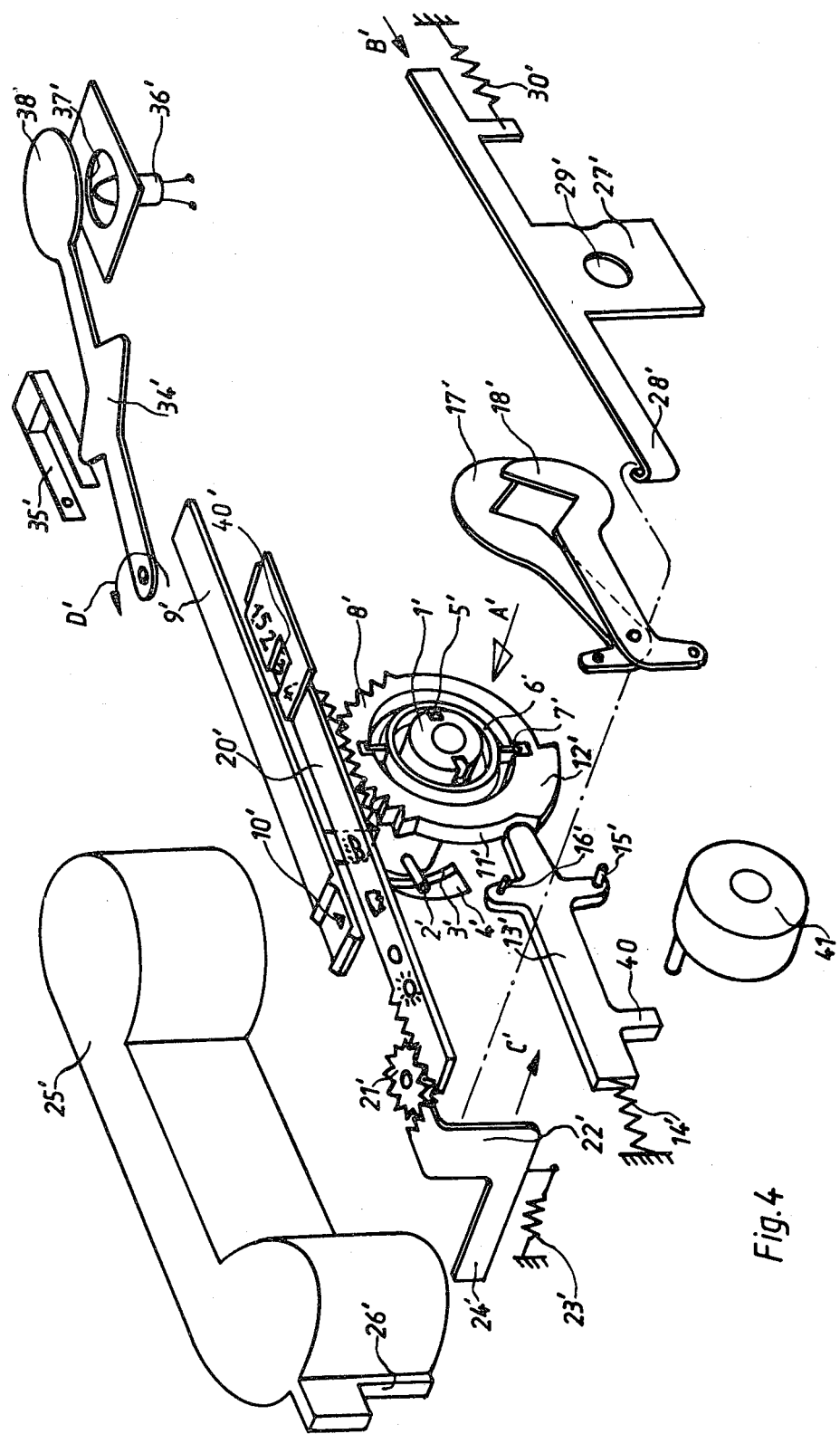
FIG. 4 is a modification of the embodiment of FIG. 1.

In the modified embodiment as illustrated in FIG. 4 the component parts corresponding to those in the embodiment of FIG. 1 are indicated by like reference numerals whereas the modified component parts are indicated by primed reference numerals.

Figure 5:
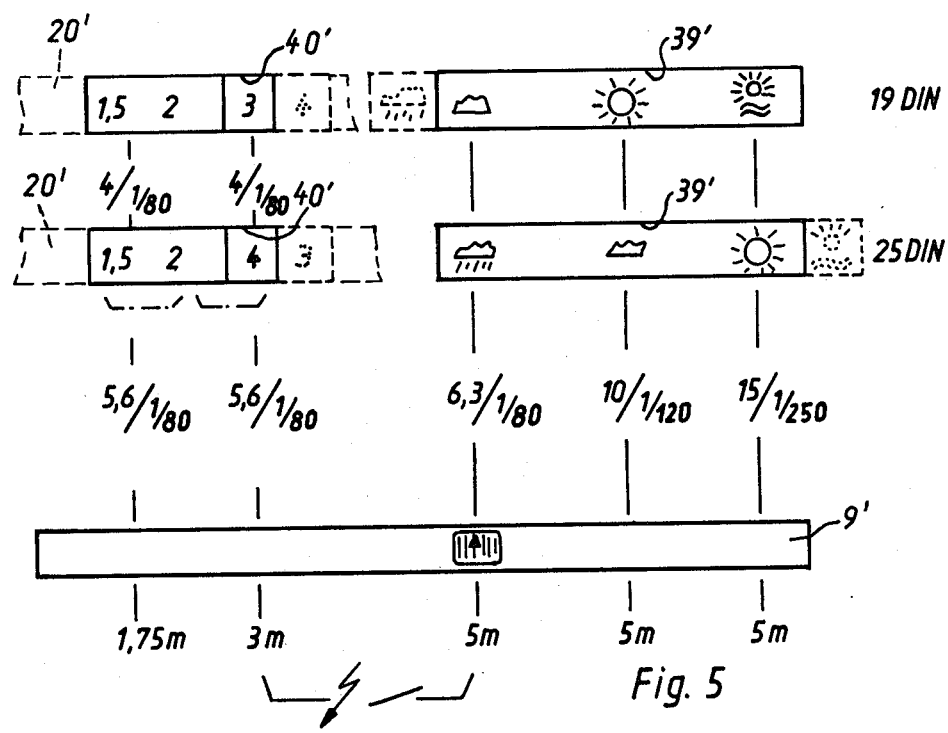
FIG. 5 shows the curve setting appearing in the windows of the camera of FIG. 4 for different film sensitivities.

A scale carrier 20' in the form of an elongated slider is provided on its upper face with symbols indicative of different exposure settings which depending on the position of the slider are individually visible through a window 39 in the camera housing (FIG. 5). Similarly as in the example of FIG. 1, the scale carrier 20' is displaceable by a movable scanner 24' in response to the film sensitivity which is coded on embossed marks 26' of the film cartridge 25'. That means, when for example film cartridges including film of sensitivity 19 DIN or 25 DIN are employed, the user of the camera can recognize immediately upon the insertion of the cartridge into the camera the exposure range at which a picture can be taken. In contrast to the embodiment of FIG. 1, the stationary cam 4' has a cam curve 3' which is not sloped in a range pertaining to the daylight exposure and consequently by moving the exposure setting member 9' to different positions made in the daylight exposure range, no change in the axial position of the objective 1' takes place. Preferably, the axial position of the objective is set in the daylight range for a value corresponding to the distance of 5 meters.

In FIG. 5 there is schematically illustrated how the user of the camera sees in windows 40' and 39' in the housing of the camera the scale and the scale symbols on the slider 29 indicative respectively of the flash distance limits and of the exposure conditions for a film having the sensitivity of 19 DIN and a film having a sensitivity of 25 DIN. In relation, FIG. 5 indicates the time settings pertaining to different diaphragm aperture values in the daylight exposure range and in the flash exposure range. The curve of the movable cam 11' has a slope which is adjusted to the pairs of exposure parameters as indicated in FIG. 5, namely to the respective aperture values and exposure times. The curve of the second movable cam 12' is similar to that in the embodiment of FIG. 1 where the largest aperture value is adjusted by the diaphragm blades 17' and 18'. The control lever 13' for adjusting the diaphragm aperture is provided with a projection 40 which controls a modular time exposure setting device 41.

Figure 6:
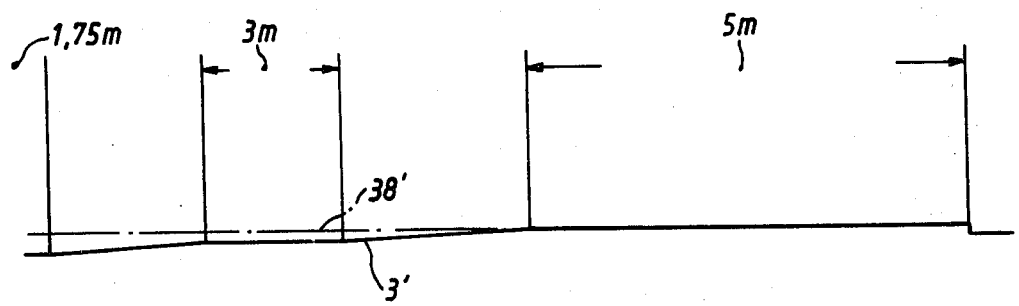
FIG. 6 is the development of the curve of the stationary cam in the embodiment of FIG. 4.

FIG. 6 illustrates the development of the curve 3' of the stationary cam 4' in the embodiment of FIG. 4. It is evident that in the daylight exposure range the setting of the axially movable objective is constant and corresponds to the distance of 5 meters. In the flash range as seen on the left-hand side of the diaphragm the course of the curve corresponds to that of FIG. 3.

It is to be understood that each of the elements described above, or two or more together, may also find a useful application in other types of constructions differing from the types described above.

While the invention has been illustrated and described as embodied in specific examples of control mechanisms for an automatic camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A photographic camera, comprising a manually operated control member for setting at least one exposure parameter; an axially movable objective for setting the exposure distance; a film cartridge provided with coded marks indicative of the sensitivity of the contained film; a scanner movable against said marks and being coupled to said control member to displace the same according to said marks; a stationary cam surface engaging said movable objective; transmission means coupled between said control member and said objective to move the latter according to a distance set by said control member and according to a predetermined curve of said stationary cam, said curve including a portion defining a distance range for a flash exposure; and a scale provided on said control member to display at least the exposure range and the applicable flash distance limits for the employed film sensitivity.

2. The camera as defined in claim 1 further including an adjustable diaphragm at least two movable cam surfaces coupled to said transmission means; and a cam follower engageable with said movable cam surfaces for controlling said movable diaphragm, one of said movable cam surfaces being assigned to a daylight exposure range and the other movable cam surface being assigned to a flash exposure range.

3. The camera as defined in claim 2, wherein said stationary cam includes three discrete cam surfaces arranged around said objective at an angular distance of 120°.

4. The camera as defined in claim 2, wherein said control member includes an elongated slider provided with toothed racks, said transmission means including at least one intermediate sleeve provided on its periphery with a gear segment engaging a rack on said sliding member and supporting said two cam surfaces.

5. The camera as defined in claim 4, wherein said intermediate sleeve engages said objective via pin and groove guiding means for displacing the objective in its axial direction.

6. The camera as defined in claim 2, wherein the movable cam surface assigned to the daylight exposure range is without sloping surface and said stationary cam defines a sloping curve.

7. The camera as defined in claim 4, wherein one of said movable cam surfaces on said intermediate sleeve has a shape corresponding to predetermined pairs of aperture settings and exposures times.

8. The camera as defined in claim 7, wherein the length of said movable cam surface on said intermediate sleeve equals the length of the stationary cam.

9. The camera as defined in claim 2; further including a built-in electronic flash device including a power supply and an indicator for indicating the readiness for use of the flash; switching means controlled by said control member to switch on said flash device during the transition of said control member from the daylight exposure range to the flash exposure range; and means for displaying said flash indicator during said transition movement of said control member.

10. The camera as defined in claim 9, wherein said displaying means includes a movable cover flag coupled to said control member and movable across said flash indicator.

11. The camera as defined in claim 10, wherein said cover flag is connected to said switching means for said flash device.

12. The camera as defined in claim 9, wherein said power supply includes a storage capacitor and said flash indicator includes a light emitting diode or a glow lamp, said switching means being connected between said storage capacitor and said light emitting diode.

13. The camera as defined in claim 2, wherein said control member includes a first slider coupled to a device for setting at least one exposure parameter, a second slider carrying a scale indicative of the exposure range and of the flash distance limits, and stationary display windows cooperating with said scales for displaying combined aperture values with time setting values and the set distance.

14. The camera as defined in claim 13 wherein a window assigned to the scale for flash distance limits includes a stationary member displaying the lowermost distance limits.

15. The camera as defined in claim 2; further including a movable additional diaphragm having a fixed aperture movable in front of said objective and being engageable with said scanner when the latter is displaced by said coded marks pertaining to high film sensitivities, the value of said fixed aperture being lower than the lowest value of the aperture of said adjustable diaphragm whereby said adjustable diaphragm, during the transition of said control member from the daylight exposure range into the flash exposure range, is set to the lowest aperture value.

16. The camera as defined in claim 15, wherein said additional diaphragm has a hook-shaped projection engageable with a leading edge of said scanner to be displaced from the path of light rays entering said objective when cassettes containing low sensitivity films are employed.

* * * * *